United States Patent [19]

Belz

[11] Patent Number: 4,671,982
[45] Date of Patent: Jun. 9, 1987

[54] COMPOSITE FOIL

[75] Inventor: Roland K. Belz, Leinfelden-Echterdingen, Fed. Rep. of Germany

[73] Assignee: RB Kunststoffpatent-Verwertungs AG, Fed. Rep. of Germany

[21] Appl. No.: 688,331

[22] Filed: Jan. 3, 1985

Related U.S. Application Data

[63] Continuation-in-part of Ser. No. 645,508, Aug. 30, 1984, Pat. No. 4,551,369, which is a continuation of Ser. No. 221,288, Dec. 30, 1980, Pat. No. 4,469,728, which is a continuation-in-part of Ser. No. 393,485, Jun. 29, 1982, abandoned.

[30] Foreign Application Priority Data

Jan. 9, 1980 [DE] Fed. Rep. of Germany ....... 3000516
Jul. 8, 1981 [DE] Fed. Rep. of Germany ....... 3126797

[51] Int. Cl.$^4$ .............................................. B05D 1/14
[52] U.S. Cl. ..................................... 428/90; 428/283; 428/284; 428/285; 428/913
[58] Field of Search ............... 428/90, 283, 284, 285, 428/913

[56] References Cited

U.S. PATENT DOCUMENTS

| | | | |
|---|---|---|---|
| 3,625,794 | 12/1971 | Arikawa et al. | 156/244 |
| 3,788,934 | 1/1974 | Coppa | 161/17 |
| 3,859,125 | 1/1975 | Miller et al. | 117/155 UA |
| 4,261,066 | 4/1981 | Belz | 4/222 |

FOREIGN PATENT DOCUMENTS

| | | |
|---|---|---|
| 862500 | 11/1952 | Fed. Rep. of Germany . |
| 1228030 | 11/1966 | Fed. Rep. of Germany . |
| 1229833 | 12/1966 | Fed. Rep. of Germany . |
| 2629127 | 12/1970 | Fed. Rep. of Germany . |
| 2008939 | 9/1971 | Fed. Rep. of Germany . |
| 2158016 | 5/1972 | Fed. Rep. of Germany . |
| 2302963 | 8/1973 | Fed. Rep. of Germany . |
| 2425655 | 12/1975 | Fed. Rep. of Germany . |
| 2525992 | 1/1977 | Fed. Rep. of Germany . |
| 1753903 | 5/1977 | Fed. Rep. of Germany . |
| 2725736 | 12/1977 | Fed. Rep. of Germany . |
| 2639512 | 3/1978 | Fed. Rep. of Germany . |
| 2703005 | 7/1978 | Fed. Rep. of Germany . |
| 3000516 | 7/1981 | Fed. Rep. of Germany . |
| 3203195 | 9/1982 | Fed. Rep. of Germany . |
| 1348115 | 2/1963 | France . |
| 308388 | 7/1955 | Switzerland . |
| 844509 | 8/1960 | United Kingdom . |
| 861423 | 2/1961 | United Kingdom . |
| 937852 | 9/1963 | United Kingdom . |
| 960203 | 6/1964 | United Kingdom . |
| 960204 | 6/1964 | United Kingdom . |

OTHER PUBLICATIONS

"Kunststoff-Verarbeitung im Gespräch", BASF, AG (1971).
"Grundlagen der Kunststoffverarbeitung", Knappe (1970).
"Blatt für Patent, etc.", 1/1935, p. 137.
"Gewerblicher Rechtsschutz und Urheberrecht", 1/1979, p. 51.
"Blatt für Patent, etc.", 1/1976, p. 24.
"Gewerblicher Rechtsschutz Wettbeaevbsrecht, Urheberrecht", 12/1981, p. 500.
Heitz, "Fullstaffe als Qualitätsverbessernde Modifikatorer", 5/1975, p. 286.
Harrehs et al., "Die Hestellung von Mowiol–Weichmache-Blerd und Seine Verarbeitung im Blasextrusionsverfahren", 1981, p. 973.
Klein, "Extrusionsbeschichtung Bahnförmiger Materialier", 1976.
"Full-und Verstärwungsstoffe für Kurststoff", Gah, 7/1977.
Hancock, "Nevere Ertwicklurgen Bei Mineralischen Fullstoffen für Kunststoffe", 1978.

Primary Examiner—James J. Bell
Attorney, Agent, or Firm—Steele, Gould & Fried

[57] ABSTRACT

A composite foil having at least two layers in which the first layer is normally water soluble and the second layer contains a dissolving intermediary for the first layer for use as packing material.

24 Claims, 3 Drawing Figures

COMPOSITE FOIL

CROSS REFERENCES TO RELATED APPLICATIONS

This application is a Continuation-in-Part of Ser. No. 645,508, filed Aug. 30, 1984 (U.S. Pat. No. 4,551,369), which is a Continuation of Ser. No. 221,288, Filed Dec. 30, 1980 (U.S. Pat. No. 4,469,728). This application is also a Continuation-in-Part of Ser. No. 393,485, filed June 29, 1982, now abandoned.

BACKGROUND OF THE INVENTION

1. Field of the Invention

The invention relates to a composite foil having at least two layers in which at least one cover or sealing layer which is normally insoluble in water, is connected to a water-soluble reaction material of at least one layer, which contains a dissolving intermediary for the sealing cover layer. The cover layer is made free from pores by its extrusion as a foil of thermoplastic material.

2. Description of the Prior Art

U.S. Pat. No. 4,261,066 (corresponding to German Offenlegungsscrift 2 703 005) in the Applicant's name, discloses a foil adapted to be used once by being laid on a toilet seat. In one embodiment the foil can take the form of a composite foil, a water-soluble layer being turned towards the user and the foil having on its side remote from the user a cover or sealing layer insoluble in water. This cover layer can be dissolved in an acid or basic medium. To cause such dissolving, the water-soluble layer contains a corresponding basic or acid additive, so that when immersed in water the foil is soluble as a whole, but the composite foil is not caused to dissolve when water contacts only its cover layer. The soluble layer is fibrous textile waste and the seal layer is synthetic material such as polyvinyl alcohol, applied very thinly by wetting the soluble layer with a dilute solution thereof in solvent, and evaporating away the solvent to leave the seal layer.

The described solvent-carried-solids method is rather complex and has certain drawbacks, such as the use of difficult to handle solvents and the need for equipment to accomplish the evaporating. Moreover, the resulting product is not entirely acceptable because pores form upon evaporating the solvent that detract from the basic function of the sealing layer, namely to prevent ingress of moisture to the reaction layer.

Parent copending application Ser. No. 645,508 (corresponding to European Patent Application 80 108 243.9), also in the Applicant's name, is directed to a further development of this toilet seat covering and mentions that such a composite foil is also suitable as a packing material and for the making of carrier bags, sachets and the like.

The foil of the kind disclosed in this latter application is extremely suitable for many applications. The sealing and reaction layers can be formed as before, but preferably they are pre-formed flat sheets by joined adhesive bonding or welding, for example dissolving the surface of the layer prior to bonding. Preferably, this foil comprises two layers of the same plastics material, but only one of them (i.e., the reaction layer) contains the solubilizers that dissolve both layers of the plastics material when exposed to water.

The foil of this general type has now also been found to be particularly useful as a packing material, not only in flexible form, but also in self-supporting form, more particularly in the form of semi-rigid to rigid sheets. Mechanical support capacity and rigidity can be achieved if the polymers of the reaction and/or cover layer are themselves formulated of rigid material or the reaction layer and/or the cover layer are provided with fillers, more particularly mineral fillers and/or fibrous material. In this manner, the reaction layer of the composite foil can be constructed in the same structures as found in packings made of paper, cardboard, pasteboard or corrugated pasteboard. The binder used in the structures is water-soluble or dissolvable by the dissolving intermediary which is contained in the reaction layer, and the dissolving intermediary preferably is effective to cause dissociation of the cover layer. Furthermore, the reaction layer, as done in papermaking, can be produced by accumulating a sediment of the components from aqueous solution in an alkaline or acid medium. The finished composite foil can therefore take conventional forms of blanks for packing material, for example being pre-punched or provided with embossed lines for subsequent folding. The foil can also be pre-shaped into boxes, if necessary with lids. The composite foil is particularly suitable as a packing for items such as cigarettes and other goods whose packaging is frequently thrown away carelessly by consumers and will contaminate the environment, unless it dissolves or rots away quickly.

In one embodiment of the present invention, composite foil is printed on, more particularly in colors. Even use of the foil as an information medium or handbill causes no permanent environmental contamination because even if the packing material is simply thrown away by the consumer, it quickly decomposes upon penetration of moisture. If the reaction layer is produced separately from the cover layer, and since the reaction layer is preferably to be printed on, the capacity to function as a print medium can be aided or the printing process facilitated by the use of suitable fillers in the reaction layer.

SUMMARY OF THE INVENTION

The object of the invention is to provide a composite foil of the aforesaid type, but a foil that is more pore-free than known foils and which can be manufactured more simply and cheaply for a variety of specific uses. According to the invention, this object is achieved in that at least the sealing layer of the foil is constructed in non-porous manner by extruding a thermoplastic material which is only soluble in water with the aid of a solubilizer. Preferably, the other layers of the foil are also produced by extrusion. Furthermore, the composite foil according to the invention is produced in a self-supporting composite sheet that is at least semi-rigid. Mineral fillers and/or fibrous materials are incorporated in the reaction layer, and the overall foil is constructed in structures and with attributes suitable for conventional uses for packings of paper, cardboard, pasteboard or corrugated pasteboard. The foil can be shaped as required for these uses, for example, punched, folded, made into a box or printed upon. The reaction layer and/or sealing layer may include flocculation agents, or such agents may be produced upon dissociation of the layers when exposed to water. The layers can include plant-fertilizing compounds, or opaque metallic vapor coatings can be applied, as required for particular packaging uses.

BRIEF DESCRIPTION OF THE DRAWINGS

There are shown in the drawings the embodiments which are presently preferred. It should be understood, however, that the invention is not limited to the precise arrangements and instrumentalities shown in the drawings, wherein.

DESCRIPTION OF THE PREFERRED EMBODIMENTS

Figure 1:
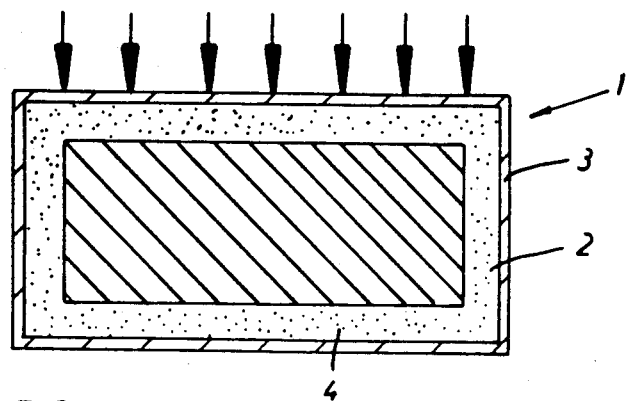
FIG. 1 is a cross-section through an embodiment of the invention in the form of a packaging for dry materials.

A number of details regarding the construction and use of composite foils, including products and processes, can be found in parent applications Ser. No. 645,508, filed Aug. 30, 1984, and Ser. No. 393,485, filed June 29, 1982. The disclosures of these applications and of U.S. Pat. Nos. 4,469,728 and 4,261,066, are incorporated herein by reference.

The objective of preparing a composite foil having a water-insoluble layer and a reaction layer that releases a solubilizer upon exposure to water, inherently requires certain properties. The sealing layer must be substantially waterproof and continuous, or moisture on the sealing layer side will have access to the reaction layer, and cause the foil to deteriorate prematurely. Therefore, one might be led to production of thick sealing layers or production of separate sealing layers that are thereafter joined to reaction layers. On the other hand, a thinner sealing layer will deteriorate more quickly when the eventual exposure to moisture occurs upon the packing being discarded. Moreover, use of a reaction layer in the form of a textile surface or a matt of individual fibers, could lead one toward applying a sealing layer in a flowable liquid form such that interstices in the textile material or fibers would be engaged. According to the invention, all these interests can be accommodated.

The cover layer and/or the reaction layer can have on their free surfaces a textile coating of individual fibers which are anchored in the top side of the foil or are glued thereto. The length of the fibers, which are preferably felted with one another to a limited extent, can be in the range of about 0.01 to 2 mm or longer. These fibers reinforce the foil mechanically and prevent sticking as the result of any electrostatic charges. Even if fibers are used in the composition of the foil, the foil will dissolve completely since although the fibers are to some extent felted to one another, they are not permanently interconnected. The fibers preferably used are cellulose, more particularly cotton fibers. Other fibrous materials are also suitable.

The cover layer and the adjacent reaction layer and any further layers are preferably interconnected, or more particularly, welded together over their whole surfaces. They can also be affixed by partly dissolving one and/or the other surface, or by means of an adhesive. The cover layer and reaction layer are preferably made of the same plastics, normally insoluble in water with the reaction layer also containing dissolving intermediary additives for itself and the cover layer. These additives can be uniformly distributed in the reaction layer or can be localized in higher concentration, for example at the boundary with the cover layer. As a rule the placement of the additives depends on the thickness of the reaction layer and the facility with which the dissolving intermediary can convert water-insolubility into solubility. If the foil has a layer made of a water-soluble material, such as hydroxy-propyl cellulose, this layer need not contain dissolving intermediary additives itself. Instead, the foil can have on the side facing the cover layer an additional intermediate layer which contains the dissolving intermediary additives for the cover layer. The moisture will pass through the soluble layer to the reaction layer.

Since the cover or sealing layer need not be self-supporting, if the reaction layer performs the supporting function, the former is as a rule thinner than the latter. The cover layer can be very thin, much thinner than required to achieve a dependable seal by such processes as the multiple applications of solvent-carried plastic materials known in the art, since it has been found that due to the characteristics of the subject film when produced by extrusion, even a layer thickness of 1 to 5 m, more particularly 2 to 3 mm, is fully adequate to achieve the required density. As a rule, therefore, the thickness of the cover layer is kept less than 10 mm. The thickness of the reaction layer depends upon how many further layers the composite foil contains, and what mechanical loadings they are required to withstand. The reaction layer thickness is at least 10 to 50 mm, and can have the thickness and typical structural shapes of paper, cardboard or pasteboard. The thickness of the reaction layer or layers can be up to 0.5 mm or even 1 mm or more, as required for the particular package. In the case of the reaction layer, there are no limits. Reinforcements can also be inserted into the layers or between the layers, preferably taking care that the reinforcements themselves readily decompose during the dissolution process, as is the case, for example, with individual fibers. The reaction layer can also be porous and even have the openwork structure of corrugated cardboard or pasteboard, more particularly a structure of corrugated pasteboard with a fine corrugation (E-corrugation) and/or a double corrugation. The composite foil can have thicknesses up to 5 mm and above.

If the mechanical loadability of the cover layer is important for a given package, it can be as thick as, or thicker than the reaction layer. For some packages, the cover layer is required to withstand some deterioration or scratching without endangering its resistance to water. In that case, the cover layer can be thicker, or even self-supporting to rigid, so that essentially the only purpose of the polymer of the reaction layer is to act as a carrier or binder for the dissolving intermediary, and not to act as the structural support.

If the thickness of the cover layer is of the order of magnitude of the thickness of the reaction layer, or the cover layer is even thicker than the reaction layer, then reaction layer is preferably so structured and formulated that it dissolves relatively slowly after having absorbed as much moisture as possible. As a result, the dissolving intermediary in the reaction layer can go into solution, and can cause the dissolution of the cover layer before the reaction layer is itself dissolved and the intermediary physically carried away by the dispersal of the reaction layer material. Otherwise there is a risk that the dissolving intermediary will be washed away before the cover layer is dissolved. For this purpose binders suitable for the reaction layer are swellable substances which become gelatinous under the action of water, but actually decompose only when the cover layer also decomposes, thereby removing their last remaining structural support.

The polymer of the reaction layer can be so adjusted that it is soluble in a substantially neutral pH or a weakly acid or weakly basic pH, but not in strongly acid or strongly alkaline pH. Accordingly, upon initial water absorption by the dissolving intermediary the pH becomes relatively strongly acid or strongly basic, and at first only the sealing cover layer dissolves. When this has been dissolved away and the dissolving intermediary has been partly leached out, the pH become more neutral and the reaction layer can then also dissolve.

The material of the cover layer is preferably resiliently formulated, so that the foil or sheet or a punched or pre-embossed blank for a packing can be bent or kinked without the cover layer breaking, tearing or otherwise being damaged to open its watertight barrier.

Suitable materials for the cover layer are extrudable plastics which are insoluble in water and the usual, mainly neutral aqueous solutions, but can be rendered soluble by suitable dissolving intermediaries, more particularly acids or bases. In contrast, the reaction layer can consist of or contain a water-soluble or retardedly soluble plastic such as polyvinyl alcohol or hydroxypropyl cellulose (Klucel of Hercules Powder), for example, as a binder for fibers and/or for the dissolving intermediary.

Preferred materials for a flexible cover or reaction layer are copolymers or terpolymers of unsaturated organic acids, such as acrylic acid, methacrylic acid, maleic acid anhydride and crotonic acid as the component reacting with the dissolving intermediary, and with vinyl ethers or acrylates as the flexibilizing component. The reactive components and the flexibilizing components can each be used alone or as a mixture. Examples of flexible materials are given in the Table, hereinafter particularly nos. 39 and 68.

Preferred materials for a rigid cover and reaction layer are copolymers and terpolymers of unsaturated organic acids, such as acrylic acid, methacrylic acid, maleic acid anhydride or crotonic acid as the component reacting with the dissolving intermediary, with styrene or vinyl acetate or methyl methacrylate as the stiffening components and vinyl ethers and acrylates as the viscosity-mediating components. The reactive components can be used on their own or as a mixture.

For instance, in one embodiment at least the cover layer consists of a thermoplastic, water-soluble homopolymeric or copolymeric acid which is, however, dissolvable in a basic medium, more particularly such an acid which has been obtained by the use of acrylic acid, methacrylic acid, crotonic acid and/or maleic acid anhydride with styrene and vinyl ether in the molar ration 1:1:0.3.

Suitable extrudable plastics are also solid copolymers of vinyl acetate and a small proportion of crotonic acid, which are present in the form of a low-viscosity polymer and are soluble in alkali. Such a polymer is marketed, for instance, under the name Vinnapas C 305 by Wacker-Chemie GmbH, Munich.

The individual layers of the composite foil can also consist of mixtures of plastics.

The dissolving intermediaries which can be used for dissolving the cover layer are acid polymers, more particularly water-soluble carbonates, secondary and tertiary phosphates, silicates, borates, amines and basic amides. The co-use of so-called detonators, which swell considerably or generate gases on contact with water, can also be advantageous. Such a detonator is, for instance, sodium carboxy-methyl cellulose (Nymcel ZSB 10 of Nyma). Preferably attention is paid to all the materials for the composite foil being environmentally harmless, as is substantially the case with the aforementioned products.

To make the composite foil, the individual, and preferably all layers of the foil are formed by the extrusion of thermoplastic substances with suitable properties and interconnected. The individual layers can be extruded as separate foils and then interconnected. Interconnection is preferable performed merely by laying the foils on one another while they are still hot and sticky.

However, as already mentioned, the surfaces can also be made sticky subsequently. The foils arriving from the extruder and if necessary stretched can either be further processed immediately or rolled up for intermediate storage, either individually or preferably in the form of a composite foil.

The individual layers can be extruded through a co-extrusion nozzle, while at the same time being interconnected. The result is a particularly intimate connection. However, care should be taken that the components of both layers are so adapted to one another that any waste can be re-used in one or other of the extruders, without having a disadvantageous influence on the composition of the material of the layers. Thus, wastes which contain dissolving intermediary can be re-used only for making a reaction layer or intermediate layer which contain the dissolving intermediary.

As a rule the individual foils come out of the extruder thicker than their required thickness in the composite foil. In that case, the foils are stretched to the required thickness; this can be done individually or compositely. There are numerous possible uses for the foil according to the invention, mainly in the packaging sector. Nowadays it is a considerable problem to dispose of no longer usable packaging materials. This can be done by the foil according to the invention, since after use it can be dissolved in water or aqueous solutions, and its material can be of such a composition that the dissolving substances are harmless and compatible with the environment. After hydrolysis, maleic acid anhydride and acrylic acid copolymers give similar products to the polymers of the acrylic acid basis used on a large scale as auxiliary flocculation agents in the treatment of clarified sludge. They are therefore useful products in sewage.

According to the Manufacturers' statements, in the toxicological aspect the cellulose derivative Klucel has the same effect as purified cellulose.

The carbonates, phosphates, silicates and borates which can be used as dissolving intermediaries are components of detergents, and so is the detonator Nymcel, which can also be used as an auxiliary flocculation agent.

Since the composite foil according to the invention is at least partly made of thermoplastic materials, the packages made from the foil can be tightly closed by welding or sealing.

All the packaging forms have the property that when thrown away after use, within an adjustable time they dissolve in an aqueous medium, or with exposure to moisture, for instance, in the open air.

In a preferred embodiment of the invention, the foil takes the form of a carton, box, container or the like. In each case the wall can be so constructed as to have a sealing cover layer on both its inner and outer sides. This can be achieved by each wall being formed by two composite sheets being so laid on one another that their water-soluble sides adjoin one another and the cover layers point outwards. This prevents the boxes or the like from being sensitive to moisture. If, on the other hand, the seal layers are mechanically torn open during or after use, water can get between the water-soluble layers of the foil, so that the foils and therefore the boxes or the like can dissolve. However, it is also possible so to construct the composite foil that a water-soluble reaction layer is provided on both sides with a cover layer. After mechanical destruction this foil is also completely dissolvable, since the water can penetrate between the cover layers into the foil and dissolve the reaction layer and then the cover layer. In this embodiment it is also possible to construct the reaction layer to be porous on the inside or to give it a suctional insert, so that the penetration of water into the reaction layer is boosted, and therefore the dissolution process accelerated. Similar considerations apply to packages made of a rigid composite foil which, as already mentioned, can have a corrugated structure in the supporting layer.

The physical and also chemical properties of the individual layers of the composite foil can be varied by using for such layers plastics formulation whose composition is correspondingly varied. The speed of dissolution of the individual layers can be determined by the ratio between the acid or basic component of the copolymer or terepolymer and the proportion of comonomers and termonomers, and additionally by the nature and content of the dissolving intermediary in the reaction layer. Furthermore, the dissolution speed of the composite foil can be further reduced by incorporating less soluble or hardly soluble substances in the disperse phase or in dissolved form in the materials of the individual layers. If desired, stickiness-increasing additives can also be incorporated in one and/or the other layer.

According to a further embodiment of the invention, the dissolving intermediary for the water-insoluble cover layer can also be incorporated in the reaction layer by the use of water-soluble hollow fibers or porous hollow fibers which are filled or impregnated with the dissolving intermediary. This can facilitate the mixing and binding in of a dissolving intermediary which is not readily miscible with the material of the reaction layer. It is also possible to provide the dissolving intermediary in encapsulated form in the reaction layer or the edge layer for sealing. Thus, the dissolving intermediary can advantageously be enclosed in so-called microcapsules, whose skin or envelope consists of water-soluble material which does not melt at the production temperature.

EXAMPLES

Further features of the invention can be gathered from the following description of particular examples, in combination with the drawings and claims.

Figure 2:
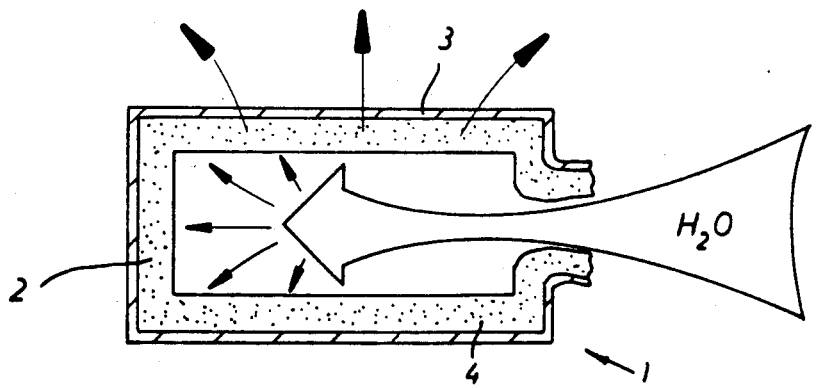
FIG. 2 is a schematic illustration of the embodiment of FIG. 1, after the package has been opened, demonstrating the entry of moisture.

In the embodiment of the invention as illustrated in FIGS. 1 and 2, the wall thicknesses of the individual layers of the packaging are shown exaggerated in size for clarity. The wall 1 of the packaging has a self-supporting reaction layer 2 which is provided with a thinner cover layer 3 on its outside. The ratio between the wall thicknesses of the reaction layer and the cover layer is about 3:1. Both the reaction layer 2 and the cover layer 3 are made of a thermoplastic copolymer which has free carboxy groups or forms such groups under the action of water and which is soluble in a basic medium, but not in acid or in substantially neutral solutions. The reaction layer 2 also contains very fine particles 4 of a basic substance which is incorporated as a dissolving intermediary. The quantity of dissolving intermediary 4 is such or present in an adequate excess to make both the reaction and cover layers soluble.

The packaging illustrated in FIG. 1 has a closed form in cross-section and can be produced, for example, by the co-extrusion of the two layers directly as a rectangular section through a correspondingly shaped rectangular nozzle. Suitable pieces can be cut to length from the resulting endless section and, after filling, closed at the ends by welding. The packaging is used for materials in the form of lumps or powder or, e.g., small domestic goods such as nails, screws or the like. It can also be advantageously used for cigarettes, foodstuffs, etc.

The water-tight cover layer makes the packaging resistant to the entry of water from outside. As shown diagrammatically in FIG. 2, when the pack has been opened and emptied, water can penetrate into the pack and gradually is accumulated to dissolve the reaction layer, due to the dissolving intermediary uniformly distributed therein. The moisture penetrates through the softened reaction layer as far as the cover layer and can dissolve the latter, due to the dissolved alkaline dissolving intermediary and the high pH value thereby obtained. In this way the pack is completely dissolved, and the lapse of time within which the pack will normally fall apart on the entry of water can be adjusted by a suitable formulation of the layers.

It is also possible to make the pack by folding a foil or sheet and then interconnecting the edges by welding or glueing. With an adequate overlap of the edges, without disadvantage the reaction layer can be left unprotected at the cut edges, since as a rule the packs do not come into immediate contact with water before their contents are removed, but are merely meant to protect their contents against the entry of moisture.

It is also possible to deform the foil according to the invention by deep drawing or the like, so as to produce a pack which consists of a carton on which the article to be packed lies, and then to cover the latter with a hood-shaped transparent plastic part of the foil according to the invention, which is rigidly connected by its edges to the carton and therefore encloses the article to be packed. The carton also advantageously has the structure of the foil or sheet according to the invention.

Figure 3:
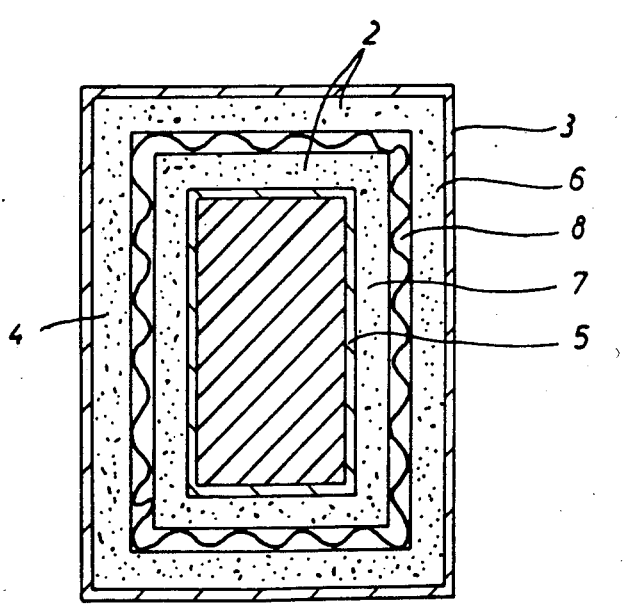
FIG. 3 is a cross-section through another embodiment of the invention, having inner and outer sealing layrs for packaging of moisture-containing materials.

In the embodiment of the invention illustrated in FIG. 3, in addition to the outer cover layer 3 the pack has an inner cover layer 5 so that the pack can also be filled internally with a liquid without the pack being dissolved. The reaction layer 2 is also double in construction; an outer part 6 of the reaction layer 2 being separated from an inner part 7 by a corrugated structure 8 acting as a spacer. The two reaction layers can also merely bear loosely against one another. The purpose of the corrugated structure 8 is to enable water to get freely in between the two parts 6 and 7 of the reaction layer 2 when the pack has been torn open, so that after the pack has been used dissolution can take place rapidly. The corrugated structure can consist of a fibrous material which also falls to pieces after or during the dissolution of the packing. It is also possible to make from such a double composite foil with cover layers on both sides boxes and flasks, for instance, by the deep-drawing or blowing processes.

Acid copolymers and termonomers are appropriate for the cover layer; and when such polymers are mixed with basic substances, they can also be used for the reaction layer. The preferred monomer producing solubility in bases is maleic acid anhydride. The comonomers used in the case of copolymers are preferably styrene or methacrylate, in the case of terpolymers, ethyl-vinyl ether or methyl acrylate and butyl acrylate also being used.

Polymerization is performed in conventional manner, using radical formers, for instance, peroxides, as catalysts at temperatures between room temperature and 200° C. The polymerization processes can be the known ones, including substance polymerization; they are preferably performed in the reaction extruder. The following Table gives a number of properties of the copolymers and terpolymers obtained. To form the reaction layer, the polymers can be mixed with up to 50% by weight of basic substance.

In the Table the abbreviations stand for the following:

| | |
|---|---|
| SOL = | Solvent |
| MAA = | Maleic acid anhydride |
| WAT = | Water |
| PHOS = | Triammonium phosphate |
| EVE = | Ethyl-vinyl ether |
| MAC = | Methyl acrylate |
| BAC = | n-Butyl acrylate |
| SUB = | Substance (solvent-free) |
| ACE = | Acetone |
| BEN = | Benzene |
| LAP = | Lauroyl peroxide |
| CHC = | Bis (4-tertiary butyl-cyclohexyl) peroxibicarbonate ("Perkadox" 16) |

EXAMPLES OF RIGID COPOLYMERS

Vinyl Acetate/Maleic Acid Anhydride Copolymerization 13 g (0.5 mole) of vinyl acetate, 49 g (0.5 mole) of maleic acid anhydride and 0.1 g of lauroyl peroxide were dissolved in 400 cc of benzene and heated for five hours at 70° C. The copolymer was precipitated from the viscous solution with petroleum ether (80° to 100° C.). The copolymer dissolved well in diluted caustic soda.

Styrene/Maleic Acid Anhydride Copolymerization 52 g (0.5 mole) of styrene and 49 g (0.5) of maleic acid anhydride were heated with 0.1% lauroyl peroxide for six hours at 80° C. A polymer was obtained which dissolved very well in diluted caustic soda.

What is claimed is:

1. A composite foil comprising:
    at least one first layer, said first layer being insoluble in pH neutral water, non-porous and being an extruded thermoplastic material;
    at least one second layer connected to said first layer, said second layer containing an solubilizer capable of dissolving said first layer when said second layer is wetted; and,
    said connected first and second layers being self-supporting.
2. A composite foil as claimed in claim 1, wherein said second layer is water-soluble.
3. A composite foil as claimed in claim 2, wherein said second layer is at least semi-rigid.
4. A composite foil as claimed in claim 3, wherein said second layer contains fillers selected from the group consisting of mineral fillers and fibrous filler material.
5. A composite foil as claimed in claim 1, wherein said second layer contains fillers selected from the group consisting of mineral fillers and fibrous filler material.
6. A composite foil as claimed in claim 1, wherein:
    said second layer is fibrous material structurally shaped and formed as at least one of paper, cardboard and pasteboard; and
    said second is further comprised of a water-soluble binder for said fibrous material.
7. A composite foil as claimed in claim 1, wherein:
    said second layer is fibrous material structurally shaped and formed of at least one of paper, cardboard and pasteboard; and
    said second layer is further comprised of a binder for said fibrous material which is soluble in said solubilizer contained in said second layer.
8. A composite foil as claimed in claim 1, wherein said foil is shaped.
9. A composite foil as claimed in claim 8, wherein said shaped composite foil is in the form of a box.
10. A composite foil as claimed in claim 1, further comprising printing on one of said layers.

TABLE

Preparation and Characterization of Maleic Acid Anhydride Copolymers
(Abbreviations on separate Sheet)

| | Comonomers | | Catalyst | | | Molar ratio | | | Polymerization temp. °C. | time h | Solubility[b] | | | | | | Plastic range[c] °C. | Films |
|---|---|---|---|---|---|---|---|---|---|---|---|---|---|---|---|---|---|---|
| | | | | | | | | | | | | NaOH | | | PHOS | | | |
| No. | I | II | | %[a] | SOL | MAA | I | II | | | WAT | 1 | 3 | 10 | 1 | 3 | 10 | | |
| 38 | EVE | | LAP | 0.1 | BEN | 1 | 1 | | 70 | 6 | 1 | | | 4 | | | 4 | 240E | flexible |
| 39 | EVE | | LAP | 0.1 | SUB | 1 | 1 | | 70 | 6 | 1 | | | 3 | | | 4 | 240E | flexible |
| 49 | MAC | | | | ACE | 1 | 1 | | 80 | 7 | 1 | | | 4 | | | 4 | 220E | flexible rather sticky |
| 51 | MAC | | | | BEN | 1 | 1.2 | | 80 | 6 | 1 | | | 3 | | | 4 | | flexible rather sticky |
| 68 | MAC | BAC | CHC | 0.1 | SUB | 1 | 0.6 | 0.4 | 60 | 7 | 1-2 | 4 | 4 | 4 | 4 | 4 | 4 | 220-230 | flexible |
| 69 | MAC | BAC | CHC | 0.1 | SUB | 1 | 0.5 | 0.5 | 60 | 7 | 1-2 | 2 | 3 | 3 | 2 | 3 | 3 | | flexible |

[a]related to monomer mixture
[b]1/3/10: 1 and 3 and 10% solutions respectively 24 hour assessment: 1 = insoluble; 2 = swells; 3 = slowly soluble; 4 = rapidly soluble
[c]measured on the Kofler bench; E = only softening 11. A composite foil as claimed in claim 1, wherein at least one of said layers is at least partially comprised of flocculation agents.

12. A composite foil as claimed in claim 1, wherein at least one of said layers is at least partially comprised of materials which produce flocculation agents when said layers is dissolved.

13. A composite foil as claimed in claim 1, wherein at least one of said layers is at least partially comprised of materials which after dissolution have soil-improving properties.

14. A composite foil as claimed in claim 1, wherein at least one of said layers is at least partially comprised of materials which after dissolution have soil-fertilizing properties.

15. A composite foil as claimed in claim 1, wherein:
said second layer is comprised of thermoplastic material; and,
said solubilizing agent is also capable of dissolving said second layer.

16. A composite foil as claimed in claim 1, further comprising an opaque layer on at lest one of said first and second layers.

17. A composite foil as claimed in claim 16, wherein said opaque layer is an aluminum vapor coating.

18. A package comprised of a plurality of layers, at least a first of said layers being an extruded thermoplastic material insoluble in pH neutral water, at least one other of said layers being in contact with said first layer and having a solubilizing agent capable of dissolving said extruded thermoplastic material, said layers being together readily decomposable in moist medium.

19. The package of claim 18 wherein said solubilizer comprises fine particles of a substance capable of solubilizing said first layer.

20. The composite foil of claim 1 wherein said solubilizer comprises fine particles of a substance capable of solubilizing said first layer.

21. The composite foil of claim 1 wherein said solubilizer is present in an amount for solubilizing said first and second layers.

22. A composite sheet material formed from at least two layers in which at least one normally water-insoluble sealing first layer is connected to at least one water soluble second layer, said second layer containing a solubilizer for said first layer, wherein said first layer comprises a non-porous layer formed by extrusion of thermoplastic material which is soluble in a non-neutral medium, and said second layer comprises a layer formed of a material which is (I) water soluble or (II) water-insoluble and soluble in a non-neutral medium, said solubilizer in said second layer being present in an amount sufficient for solubilizing said first layer and said second layer when the latter is also formed by extrusion of a water-insoluble material and wherein at least one of said first and second layers is self-supporting.

23. The sheet material of claim 19 wherein said second layer is formed by extrusion.

24. The sheet material of claim 19 wherein said solubilizer comprises fine particles.

* * * * *

UNITED STATES PATENT AND TRADEMARK OFFICE
CERTIFICATE OF CORRECTION

PATENT NO. : 4,671,982

DATED : June 9, 1987

INVENTOR(S) : Roland K. Belz

It is certified that error appears in the above-identified patent and that said Letters Patent is hereby corrected as shown below:

Column 11, line 20 delete "solubilizing agent" and insert --solubilizer--.

Signed and Sealed this

Tenth Day of November, 1987

Attest:

DONALD J. QUIGG

Attesting Officer

Commissioner of Patents and Trademarks